United States Patent

Weigl et al.

[11] 4,255,040
[45] Mar. 10, 1981

[54] POSITIVE OVERLAY ELECTRONIC XEROGRAPHIC PRINTER

[75] Inventors: John W. Weigl, Webster; William M. Reilich, Ontario; Louis D. Mailloux, Fairport, all of N.Y.

[73] Assignee: Xerox Corporation, Stamford, Conn.

[21] Appl. No.: 926,346

[22] Filed: Jul. 20, 1978

[51] Int. Cl.³ ............................................. G03G 15/00
[52] U.S. Cl. ..................................... 355/3 R; 355/4; 430/31
[58] Field of Search .................. 355/3 R, 14, 31 R, 4; 96/1 R, 1.3, 1.4, 1.2; 430/31, 126

[56] References Cited

U.S. PATENT DOCUMENTS

| | | | |
|---|---|---|---|
| 3,960,444 | 6/1976 | Gundlach et al. | 355/3 DD |
| 4,043,656 | 8/1977 | Cherian | 355/3 R |
| 4,045,218 | 8/1977 | McVeigh | 355/4 X |
| 4,046,471 | 9/1977 | Branham et al. | 355/14 |
| 4,083,632 | 4/1978 | Mailloux et al. | 355/3 R |
| 4,122,462 | 10/1978 | Hirayama et al. | 355/3 R X |
| 4,124,286 | 11/1978 | Barasch | 355/3 R |

*Primary Examiner*—Fred L. Braun
*Attorney, Agent, or Firm*—Michael H. Shanahan

[57] ABSTRACT

Positive form overlays are used to make composite images with a positive mode xerographic printer having a laser scan exposure mechanism. The laser scan or electronic exposure mechanism uses an oscillating galvanometer mirror to sweep a scanning spot over a cylindrical shape photoconductor. The xerographic processor includes a transfer drum able to recycle a sheet relative to the photoconductor to transfer at least two sequentially generated xerographic toner images to the same side of the same support in registration. One image is made in response to electronic signals and the other from the positive overlay thereby yielding a composite toner image.

13 Claims, 2 Drawing Figures

POSITIVE OVERLAY ELECTRONIC XEROGRAPHIC PRINTER

BACKGROUND

This invention relates to impactless electronic printing method and apparatus. Specifically, the invention relates to an electronic xerographic printer having a non-electronic overprinting capability known as a "form overlay" feature.

Form overlays are particularly suited for printing tasks where variable data or images are to be added to fixed data or images. For example, the thousands of bank statements provided to depositors are fixed images to which the variable debit and credit data of the many individual depositors is added or integrated. However, the bank statement printing chore is comparatively straight forward because the form contains blank or white spacers for receiving the variable debit and credit data. That is, the variable data doesn't overlie the fixed data. A more complex task is overprinting a travelers route onto a complex map where two images or sets of data are printed in the same area on the paper or other support member.

The forms overlay technique is advantageous to electronic printing and computer printing in particular because its use saves the electronic memory storage space required to electronically print the form for other electronic control functions. Often this saving in memory space yields a meaningful cost improvement to the entire printing system.

Prior art forms overlay electronic impactless printers are negative on negative printers. The Xerox Corporation Xerox 1200 Computer Printer, the Siemens Corportion Siemens 3352 Laser Printer and the International Business Machine Corporation IBM 3800 Printing Subsystem are examples of negative on negative or negative overlay electronic printers. Briefly, in each, a latent electrostatic image is generated in response to electronic signals on a charged photoconductive surface by exposing the charged surface to electromagnetic radiation (hereinafter "light") thereby discharging the surface in areas struck by the light. The discharged areas against the undischarged background define the negative latent electrostatic image. (The inverse defines a positive latent electrostatic image.) The discharged areas are analogous to white markings on a black background for a reflection image or transparent markings on an opaque background for a transparency image. The negative latent image is made visible or developed by depositing black toner onto the discharged areas and transferring the black toner to white paper. The development and transfer steps convert the negative latent electrostatic image to a positive reflection image. The toner image printed from the electronic signals is herein referred to as an electronic image or print.

The "form overlay" print or image is created by the above commercial computer printers by exposing the charged photoconductive surface to a light image of a negative reflection print or negative transparency print or overlay. When the negative overlay is flooded with light and the reflected or transmitted light strikes the photoconductor a negative latent electrostatic image is created. The overlay latent image is composed of discharged areas representing markings on a charged background. The development and transfer of the overlay latent image inverts or converts the negative sense of the image to the positive sense as in the case of the above described electronic image.

The overlay and electronic images are generated during a single cycle of the above xerographic computer printers. Each of these printers employ a rotating photoconductive drum and the electronic and overlay images are generated during a single cycle or rotation of the drum prior to the development step. This means that one image is superimposed over the other on the same area of the photoconductive drum. This superimposition is possible because of the negative mode of operation. The first image, e.g. the electronic image, discharges the drum only in information areas and not background areas. Statistically, the information areas occupy significantly less space than the background areas. Consequently, the second image, in this example the overlay image, is recorded in the charged background regions of the electronic image. In other words, the second image can be produced only if the first left significant areas of charge on the drum surface on which the second image can be recorded.

The foregoing explains one reason why a positive form overlay capability analogous to the negative form overlay is not used in a positive electronic image recorder such as that of the Xerox Corporation 9700 Computer Printer. In the Xerox 9700 machine, the discharged regions of a photoconductive member (a belt in this machine) are the background areas and the charged regions are the information areas. Here, once the electronic image is created, there is effectively no charged region on the drum in which to record the subsequent overlay information except that information areas of the electronic image which is normally inadequate. Also, writing the overlay image in the information region of the electronic image is likely to destroy its content.

A significant disadvantage of prior art negative on negative overlay computer printers is the fundamental problem that negative prints are expensive if for no other reason than their unavailability. The majority of the world's images are black marking on white backgrounds, i.e., positive images. This disadvantage is amplified when an electronic printer is employed in an application where many different forms are to be printed on by variable information. Also, when the original document is a color image the negative image sense of it may not be appropriate for an overlay.

SUMMARY

Accordingly, it is an important object of this invention to make composite or integrated prints using a positive on positive overlay electronic printer.

Another object of this invention is to devise means for integrating multiple images into a single image without the superimposing of one image on another significantly effecting the information content of either.

Still another object of the present invention is the addition of variable information to complex overlay images.

Yet a further object of this invention is to make toner images with an electronic printer having a positive overlay capability and multiple color imaging capabilities.

Also, an object hereof is the formation of a composite electronic and overlay toner image at the transfer step rather than at the latent image forming step of a electrostatographic printer.

The foregoing and other objects of the present invention are achieved by combining an electronic raster scan image generator with a xerographic printer having an overlay image exposure mechanism and a registration transfer means for transferring sequentially generated toner images in registration to the same side of a sheet of paper. Also, control means are provided to create the electronic and overlay images sequentially so as to be overlaid on the same sheet of paper by the transfer means. The foregoing invention is achieved, for one, by recognizing that the positive on positive mode of electronic overlay printing is obtainable by integrating the electronic and overlay images at the transfer step of an electrostatographic printer rather than at the latent electrostatic image forming step practiced in the prior art.

PRIOR ART STATEMENT

The above noted Xerox 1200, Siemens 3352 and IBM 3800 Printing Subsystem Computer Printers are examples of electronic overlay printers. However, since they practice the negative on negative mode of overprinting they teach away from the positive to positive mode of printing. For one, a positive overlay simply can't be used by these printers. In fact, the positive on positive mode is not possible with these printers even if they were converted to operate from positive images. In the case of the conversion to a positive image sense machine, the first image, e.g. the overlay, discharges substantially the entire image forming area of the photoconductor leaving no charged region in which to form the second image, e.g. the electronic image. For this very reason, the above noted Xerox 9700 Computer Printer does not have a separate optical overlay mechanism.

The Xerox 6500 Color Copier is a machine that includes a registration transfer means for transferring sequentially generated toner images in registration to the same side of a single sheet of paper. The incorporation of an electronic imaging capability into the Xerox 6500 machine still does not yield the instant invention since the prior art teaches the overlay function as occurring at the latent image forming step. However, since the Xerox 6500 creates positive latent electrostatic images on its photoconductive member, the teaching of the prior art negative on negative overlay printers predicts failure for the foregong combined machine.

U.S. Pat. Nos. 4,027,961 and 4,064,471 disclose electronic impactless printing machines having dual exposure devices that use positive latent images. One exposure device is an electronic exposure mechanism and the other an opaque original exposure mechanism. Both describe the systems as dual mode copiers or printers with images being made with one or the other mechanism. The two exposure mechanisms in the U.S. Pat. No. 4,021,961 are mutually exclusive since they share the same mirrors and lens for exposing the drum. Also, the opaque exposure mechanism is a flash system and the electronic exposure system is a moving spot raster scanning system.

The electronic scanning exposure system of the U.S. Pat. No. 4,046,471 writes "white" in the border areas of an opaque image projection. Clearly, this operation is analogous to the negative on negative overlay operations of the above described computer printers wherein there is provided separate areas on the photoconductor for each exposure mechanism to operate. In contrast, the instant positive on positive overlay electronic printer permits the entire image areas to be written on by both the electronic and the opaque (or transparency) exposure mechanism for the generation of an overlaid image. Significantly, neither the U.S. Pat. Nos. 4,046,471 or the 4,027,961 disclose a transfer means for transferring two images to the same side of the same sheet of paper in registration.

None of the above patents or existing commercial electronic printers either alone or together, suggest the instant combination of elements. Positive on positive overlay electronic printing heretofore has been viewed as not possible because the formation of one image inside the image area of another is considered impractical. Furthermore, the use of pre-printed forms in positive mode xerographic electronic printers has been viewed as an adequate alternative to negative on negative overlay electronic printers.

DESCRIPTION OF THE DRAWINGS

Other objects and features of the present invention will become apparent from the present specification and from the drawings alone and when viewed in conjunction with the specifications. The drawings are as follows.

DETAILED DESCRIPTION

Figure 1:
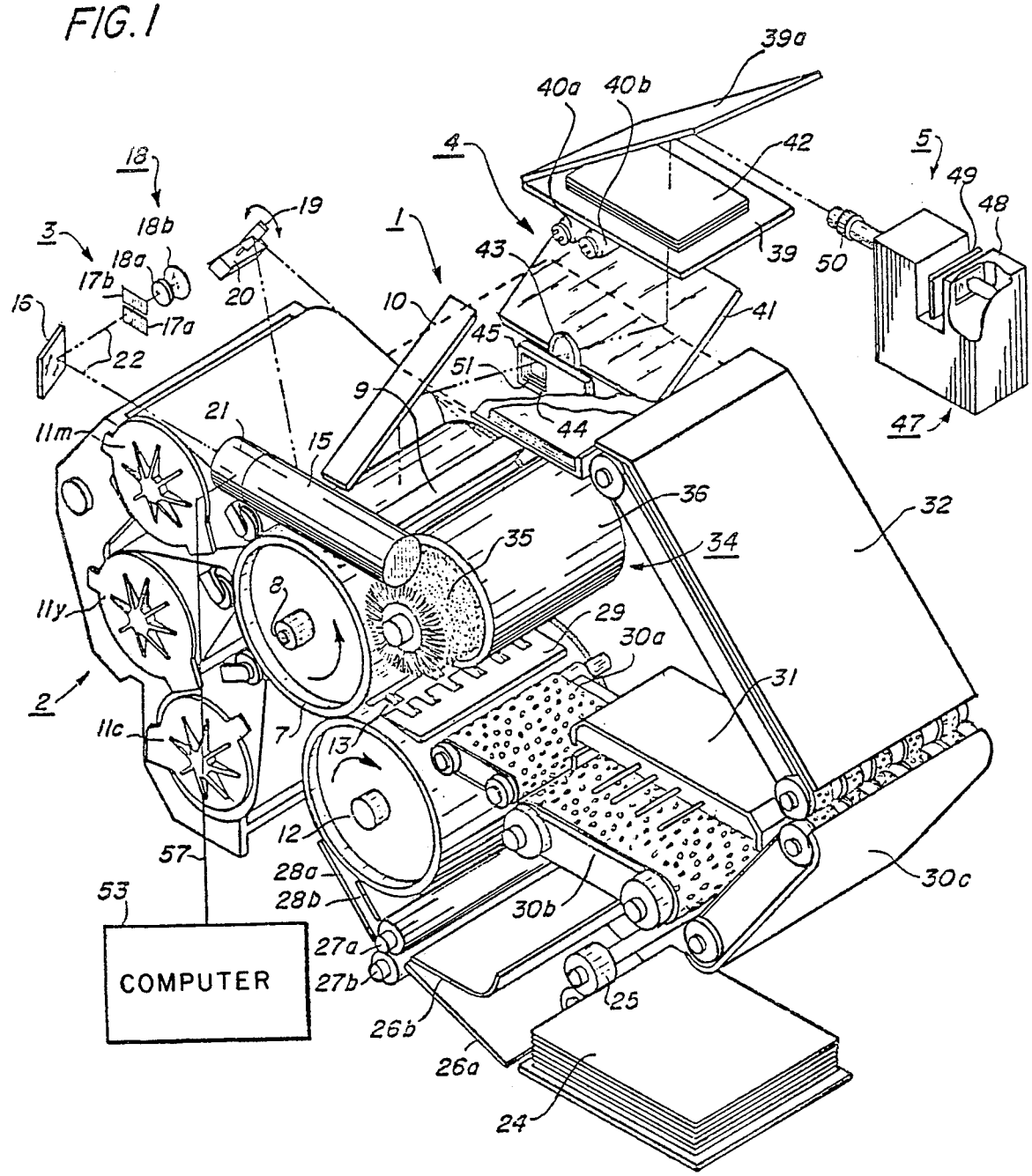
FIG. 1 is a perspective view of a positive on positive electronic overlay printer according to the instant invention.

The electronic positive on positive electronic printer 1 in FIG. 1 is composed of the xerographic processor 2, the electronic exposure means 3 and the overlay exposure means 4 for opaque positive overlays and means 5 for transparent positive overlays.

An Express Incorporation by Reference of U.S. Issued Patents

The disclosures of U.S. Pat. Nos. 3,906,897 and 3,934,549 to James R. Davidson; U.S. Pat. No. 3,936,182 to Sikander Sheikh relating to the electronic printer 1 are hereby expressly incorporated herein by reference. Also incorporated herein by reference are the disclosure of U.S. Pat. No. 4,027,962 to Louis D. Mailloux and U.S. Pat. No. 4,014,607 to Abraham Cherian relating to the transparency overlay exposure means 5.

The xerographic processor includes a photoconductive drum 7 journaled for rotation about the axis 8. The drum is grounded conductive metal cylinder having a selenium alloy coated onto its outer periphery. Images, copies of prints are made during each full revolution of the drum 7 by uniformly electrostatically charging the surface of the drum with the corotron changing means 9. The corotron includes a thin wire closely spaced in parallel to the photoconductive image forming surface. The wire is coupled to a high voltage source causing ionization of the gases about the wire. The voltage coupled to the wire is positive for machine 1 thereby repelling the positive ions to the surface of the photoconductive drum.

The uniform charge layer placed onto the drum surface is altered by the positive overlay light image reflected off mirror 10. The generation of the overlay light image will be discussed more fully below. Unlike the prior art negative on negative overlay electronic printer, the drum areas discharged by light represent the background areas rather than the information areas of the final print. The latent electrostatic image is developed by one of the three development mechanisms 11m, 11y and 11c, conventionally filled with magenta, yellow and cyan toners, respectively. This too is explained more fully later on herein.

The developed latent image, referred to as the toner image, is next transferred to a sheet of paper loaded onto the registration transfer drum 12 which is of the same diameter and length as the photoconductor drum 7. The sheet is loaded into the drum 12 so its lead edge is in registration with the lead edge of the developed toner image at the transfer nip formed at the line of contact between the transfer and photoconductive drums 7. A voltage potential is coupled to the conductive transfer drum of the appropriate polarity to electrostatically transfer the toner to the sheet while the two drums rotate at the same speed.

The lead edge of the sheet of paper is clamped to the drum by gripper means 13. Consequently, the sheet is recycled to the photoconductor 7 for transfer to the sheet of a subsequently generated toner image in registration with the first.

For purposes of explanation, the subsequent image is the electronic image generated by the electronic exposure means 3. Means 3 includes the laser 15, mirror 16, stops 17a, and b, lens elements 18a and b and mirror 19 mounted on sweep galvanometer 20. The modulator 21 is a piezoelectric device whose crystalline structure changes in response to an applied electrical signal. Effectively, the crystal is a variable defraction grating. When no signal is applied, laser beam 22 strikes the loop 17a and when a signal is applied to modulator 21 the beam passes through the slit formed between stops 17a and b. The light passing the stops 17a and b is reflected onto the photoconductive drum 7 via mirror 19. The mirror 19 oscillates back and forth at a fixed rate to sweep the beam 22 along the periphery of drum 7 parallel to axis 8. As the beam is turned on or off, i.e. defracted between the slit and the stop 17a, the instantaneous values or intensities of the sweeping beam write a positive latent image onto the charged drum. This positive electronic latent image is developed by one of the three development means 11m, 11y or 11c, either the same as the first or a different one, as desired.

The sheet of paper is loaded onto drum 12 as follows. The top most sheet in stack 24 is fed toward the drum 12 by means including the friction feed roller 25. The guide plates 26a and b stear the sheet into the bite of timing feed rollers 27a and b. The sheet stops at the timing rollers which are at rest. The sheet is continued forward toward the drum 12 when rollers 27a and b are rotated at the proper instant to permit the lead edge of the sheet to be engaged by the gripper means 13. The sheet loading guide plates 28a and b guide the sheet to the gripper.

The sheet is unloaded or stripped from the drum after the desired number of toner images have been transferred to it. In fact, the electronic image can be repeated three times so that magenta, yellow and cyan toner images are repeatedly transferred to a sheet held onto drum 12 for three revolutions. The result is a fourth color; namely, a black image formed from the three complementary toner images.

The sheet is unloaded from the drum 7 when gripper means 13 release the sheet and stripping blade 29 is camed against the drum to peel the sheet off. The unloaded sheet is conveyed by belt transports 30a, 30b past the radiant fuser 31 where the toner is melted. Upon cooling, the toner is permanently attached to the sheet. The conveyor or transport 32 carries the fused, integrated, overlay and electronic toner images to a collection tray (not shown) located at the top of the machine 1.

The cleaning mechanism 34 includes a fiber brush roller 35 mounted inside a housing 36 that removes any residual toner from drum 7 prior to the recharging of the drum by corotron 9 for the subsequent image forming cycle.

The opaque overlay exposure means 4 includes the platen 39, lamps 40a and b and plane mirrors 10 and 41. An opaque positive original (called an overlay) is placed image side down onto the platen which is transparent glass or plastic. (The device 42 is a field or relay lens used in conjunction with the transparency overlay exposure means and is removed when the opaque mechanism is in use.) The lamps 40a and b are mounted to move along the platen at the same velocity as the tangential velocity of drum 7. As the lamps move, a light line segment of the overlay on platen 39 is reflected between the lamps toward the mirror 41. This mirror routes a reflection image of the positive original to mirror 10 through lens 43 and the opening 44 in filter holder 45. The mirror 10 in turn reflects the image downward onto the drum. The lens 43 and filter holder 45 are mechanically coupled and together move at half the velocity of the scanning lamps 40a and b. Means 4, therefore, subjects the charged drum to a slit scan exposure of positive light image of an overlay on the platen.

The transparency overlay exposure mechanism 5 includes the 35 mm color or monochrome slide projector 47. A light bulb and condenser lens (not shown) are enclosed in the rear portion 48 of the projector and are arranged to flood a 35 mm positive slide 49. The slidde is the overlay. The light transmitted through slide 49 is imaged by the projector lens 50 onto a field or relay Fresnel lens 42. The relay lens refocus the image of the overlay onto the clear aperture of the lens 43 and in turn the photoconductor 7.

The lamps 40a and b once again travel the platen 39 at the same velocity as the tangential velocity of drum 7. A segment of the light coming from the projector 47 passes between the moving lamps and into the moving lens 43. In this way, a full frame exposure of the image focused onto relay lens 51 is in turn projected by lens 43 onto the drum. The lamps 40a and b need not be turned off at this time since the relay lens 42 does not reflect any of the light from these lamps toward the lens 43.

The filter holder 45 includes the clear aperture or opening 44 positioned in the optical path of lens 43. Normally, the clear aperture or a neutral density filter are used when black and white overlays, (whether opaque document or a transparent slide,) are used. The holder 45 includes three rails 51 that in turn support three transmission filters. One filter transmits green light, another blue light and the third red light. These filters are used to make color copies or prints from a color original (whether an opaque or transparency). First the green filter is inserted into the opening 44 (automatically under control of the machine logic) and the resultant latent electrostatic image is developed with the magenta developer 11m. The magenta toner image is transferred to a sheet of paper via transfer drum 12 on the first rotations of equal size drums 7 and 12. On the second rotation of drums 7 and 12, the green filter is replaced with a blue filter and the yellow development means 11y is activated. The yellow toner image is transferred or overprinted on top of the magenta toner image by the transfer drum, Finally, during the third revolution of drums 12 and 7, the yellow filter is replaced in opening 44 by a red filter and the cyan developer means 11c activated. The cyan toner image is thereafter transferred in registration on top of the previously transferred magenta and yellow toner images. The composite image is a full color replica of the overlay.

The light source in the transparent exposure means must be off when the electronic exposure means 3 is writing a latent electrostatic image on drum 7. Lamps 40a and b are also turned off. However, the lamps 40a and b can be left on provided no light from them is reflected into lens 43. This means the platen cover 39a must be up or a black sheet must be placed on the platen 39. The electronic latent image may be developed by any of the three development means 11m, 11y or 11c. Regardless, the electronic image will be integrated with the three other separation images created by the green, blue and red filters to yield some distinctive overlay effect. The key here as well as in the monochrome embodiment described earlier is that the user is free to work with positive image sense originals.

Whether the electronic or overlay latent image is generated first is immaterial to the over printing operation but the effect in the resultant image is likely to be different. Clearly, the choice of order for the sequentially generated electronic and overlay images and for the particular filters used in connection with each offers many opportunities to achieve a wide variety of printing goals.

Figure 2:
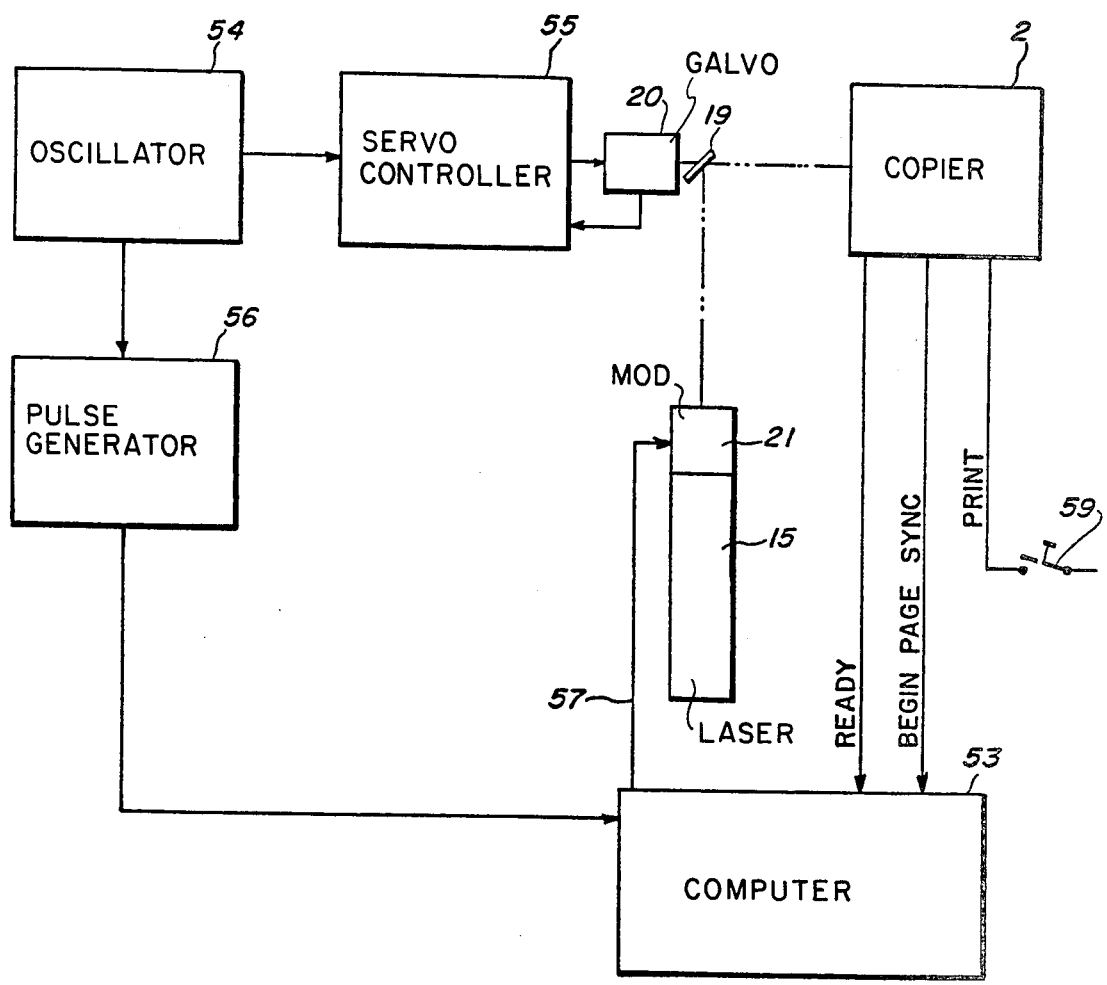
FIG. 2 is a schematic diagram illustrating the interconnection of the control means for operating the electronic scanning exposure means and for sequentially activating the overlay exposure means and the electronic image exposure means.

Turning now to FIG. 2, the operation of the electronic exposure means and the activating means for sequentially activating one and then the other of the two exposure system will now be discussed. Like elements in FIGS. 1 and 2 have the same reference numbers. Laser 15 emits a beam of coherent radiation 22 which is modulated by acousto-optic modulator 21, which in turn is controlled by signals stored on a magnetic disc in a computer. The electronic image stored in the computer may be totally constructed by a software program or may be constructed from data obtained by a raster scan of an original document.

The off-on modulated laser beam 22 is reflected from mirror 16 through the slit formed by stops 17a and b, and the lenses 18 to the galvanometer mirror 19. A back and forth oscillation of mirror 19 provides the horizontal laser scanning of the charged photoconductor surface 7. Lenses 18 serve to expand and spot focus the beam 22 onto the photoreceptor surface 7.

Computer 53 can be any suitable computer which provides the required video information to modulator 21 in synchronization with the operation of electrophotographic copies 10. Suitable computers include for example Nova computers available from Data General Corp., Route 9, Southboro, Mass., 01772, and PDP11 series computers available from Digital Equipment Corp., Maynard, Mass., 01754. Any suitable conventional computer software may be used to coordinate computer 53 and copies 10. Alternately, the video signal, i.e. the on-off image information, supplied by the computer 53 can come from other sources. For example, video signals transmitted directly from an electro-optical scanner at a near or remote location can be used to drive the electronic exposure mechanism as well understood in the facsimile and data transmission arts.

Referring again to FIG. 2, oscillator 54 generates two signals or wave forms. One is a sawtooth wave coupled to servo controller 55 which in turn generates signals to drive galvanometer 20. The second signal from oscillator 54 is coupled to pulse generator 56 which in turn issues a delay or lag adjusted signal to computer 53. The delay signal is a synchronization signal to synchronize transmission of the video signal over line 57 to modulator 21 with the start of scan by the galvanometer 20. When remote print switch 59 is closed, a print signal is generated to activate the xerographic processor 2 and computer 53. At the proper moment in the rotation of drum 7, a start of scan sync signal is transmitted by the processor 2 to computer 53.

The xerographic processor 2, and the overlay exposure means 4 and 5 are the commercially available Xerox 6500 Color Copies with its 35 mm slide projector attachment. The laser 15 and modulator 21 are a combined package commercially available from Coherent Radiation Incorporated, Laser Division, 3210 Porter Drive, Palo Alto, Calif. 94304. The package is known as the Write Lite CR-135 modulated laser featuring a two milliwatt Helium-neon (red light) 632.8 nm laser and an acousto-optic modulator. The modulator 21 and a laser power supply (not shown in FIG. 2) are also part of the commercial package from Coherent Radiation Incorporated. The stops 17a and b are spaced apart by about 1 millimeter (mm) and include very sharp straight surfaces akin to razor blades. The focal lengths lenses 18a and 18b are respectively −26 mm and 55 mm. The lens 18a expands the laser beams and lens 18b focuses the beam to a spot on the drum 7.

Galvanometer optical scanner 20 is the G-100 PD Optical Scanner commercially available from General Scanning Inc., 150 Collidge Avenue, Watertown, Mass., 02172. It is a moving iron galvanometer. It incorporates a position transducer that operates by detection of capacitance variation between a rotating armature and a set of stationary electrodes designed specifically for closed-loop operation. Closed-loop galvanometer drive electronics included within the commercially available device use a position signal generated by the position transducer to improve and maintain the positional accuracy at the galvanometer mirror with respect to the oscillator drive voltage. Start and end of scan signals (or timing) are derived from the oscillator drive 54.

The galvanometer is operated at 400 scans/second and the photoreceptor surface is advanced at about 4 inches/second. These speeds yield a scan or raster pattern of 100 scans/inch on the moving photoreceptor 7. The laser exposes the photoconductor surface 7 at about 1½ inches after the exposure location of means 4 and 5.

Servo controller 55 is commercially available from General Scanning, Inc., and is designated the CCX-100 Servo Controller. Oscillator 54 is an HP 3301B for Hewlett-Packard Co., 1501 Page Mill Rd., Palo Alto, Calif. 99304. Pulse generator 56 is a Datapulse A100 from Datapulse Inc., Culver City, Calif.

The computer 53 is also the control or activating means for activating the overlay and electronic exposure means to produce latent images sequentially. The order of activation is optional. Either the electronic latent image or the overlay latent image may be generated first with the other being the next generated image. Specifically, a software program executable by the computer effects the desired sequential imaging. Any appropriate software program suitable for executing the desired functions may be used and its details will vary depending upon the entire toner image printing strategy of a user.

By way of example to aid in the present description, the overlay image is described as the first image to be generated. The image process is initiated when lamps 40a and b begin a scan of platen 39. The laser is turned off at this time or stop 17b is moved against stop 17a to close the slit between them. If an opaque overlay is on the platen the lamps 40a and b are on. When the projector 47 is begin used the lamps still scan the platen and the light from the projector passing between the lamps exposes the drum 7. The light from lamps 40a and b is not reflected to the drum 7 at this time because the platen cover 39 is up. At the end of the scan of lamps 40a and b, i.e., after they've traveled the length of platen 39, the overlay latent electrostatic image is formed on drum 7. The latent image is developed, for example, by magenta toner in development means 11m. The magenta image is transferred to a sheet of paper on transfer drum 12.

On the next rotation of drum 7, the lamps 40 and projector 47 are both off and the exposure of drum 7 during this revolution is totally due to the light or scanning spot from laser 15. As the drum rotates from the same starting point as that for the magenta image, the galvanometer mirror 19 sweeps the modulated laser beam 22 repeatedly across the drum to construct in a raster pattern an electronic latent image. (The electronic exposure means 3 is consequently also referred to as a raster scan moving spot exposure means.) The surface area on the drum 7 holding the electronic latent image is substantially the same as that which held the overlay latent image. The image area is freshly recharged uniformly by corotron 9 prior to the start of the laser scan.

Again by way of example to facilitate the description, the electronic latent image is developed with yellow toner in the development means 11y. It should be understood that either the magenta or cyan development means 11m and 11c could be used as well. This is an option of the user. The yellow toner image is transferred in registration to the sheet that previously received the cyan image. This combined cyan and yellow toner image on the sheet of paper is stripped from drum 12 and conveyed to the fuser 31. Next the fused toner image is delivered to the user via transport 32.

The integrated toner image is formed from sequentially generated electronic and overlay latent images. The generation of the foregoing two images may be separated by an additional image formed by either the overlay or electronic exposure means and developed by the cyan toner in development means 11c. The cyan toner image in turn is transferred to the same sheet. When all three toner images are on the same sheet they create a more complex overlay print. Clearly, the instant invention contemplates the infinite variety of overlay and electronic images developed with the same or different color toners. In fact, a black toner development means may be added along with the development means 11m, 11y and 11c. Alternatively, black toner may be substituted for the yellow toner in development means 11y or for the toners in the other two development means 11c and 11m.

The foregoing description will suggest other modifications and variations. Such modifications and variations are intended to be within the scope of the instant invention.

What is claimed is:

1. A positive overlay electronic printer for producing integrated toner images on support members from electronic signal generated positive images and positive overlays comprising
   a photoconductive member including an image forming surface supported for movement enabling the sequential production of toner images,
   charging means for uniformly electrostatically charging the image surface of the photoconductor member,
   overlay exposure means for creating a positive latent electrostatic image of a positive overlay by exposing the uniformly charged image surface to a positive light image corresponding to the positive overlay defining the background regions of the latent image as the discharged regions on the surfaces,
   electronic exposure means responsive to electronic signals for creating a positive latent electrostatic image of an image represented by electronic signals by moving a discharging scanning spot relative to the uniformly charged image surface defining the background regions of the latent image as the discharge regions on the surface,
   development means for developing latent images by depositing toner material on the surface to produce positive toner images with toner that adheres to the charged areas of the surface thereby corresponding to the latent image,
   registration transfer means for transferring in registration sequentially developed toner images from the image surface to the same side of the same support member and
   activating means for activating the electronic exposure and overlay exposure means to produce electronic and overlay latent images sequentially in either order for production of electronic and overlay toner images by the development means and for transfer of the sequentially produced electronic and overlay toner images to the same side of the same support member by the transfer means to produce said integrated toner image.

2. The printer of claim 1 wherein said registration transfer means includes a transfer drum and gripping means for attaching a support member thereto positioned adjacent the photoconductive member for transferring an overlay toner image to a support member during a complete rotation of the transfer drum and for transferring an electronic toner image to the sheet during a different rotation of the drum.

3. The printer of claim 1 wherein said photoconductive member is supported on a drum mounted for rotation at the same speed as the transfer drum and being substantially equal in size to the transfer drum.

4. The printer of claim 1 wherein at least two development means are positioned adjacent to the photoconductive member with each having different color toner material therein and wherein said activating means includes means for activating one development means for developing the overlay latent image and for activating a different development means for developing the electronic latent image.

5. The printer of claim 1 wherein said overlay exposure means includes means for generating a positive light image from an opaque positive overlay.

6. The printer of claim 1 wherein said overlay exposure means includes means for generating a positive light image from a transparent positive overlay.

7. The printer of claim 1 wherein said overlay exposure means includes means for generating a positive light image for either an opaque positive overlay or from a transparent positive overlay.

8. The method of producing an integrated toner image on a support member from electronic signal generated positive image and positive overlays comprising electrostatically charging uniformly the substantially continuous surface of a photoconductive member, exposing the uniformly charged photoconductive surface to a positive light image corresponding to a positive overlay creating an overlay latent electrostatic image thereby defining the background regions of the latent image as the discharged region on the surface, developing the overlay latent image by depositing a toner material onto the latent image creating a positive overlay toner image, transferring the overlay toner image to one side of a support member, recharging uniformly the photoconductive surface from which the overlay toner image is transferred, exposing the uniformly recharged surface of the photoconductive member to a positive light image created by electronic signals by moving a discharging scanning spot relative to the recharged surface creating an electronic latent electrostatic image thereby defining the background regions of the latent image as the discharged regions on the surface, developing the electronic latent image by depositing a toner material onto the latent image creating a positive electronic toner image and transferring in registration the electronic toner image to the same side of the same support member to which the overlay toner image was transferred producing said integrated toner image.

9. The method of claim 8 wherein said electronic toner image is created and transferred to the support member first and the overlay toner image is created and transferred to the same side of the same support member second.

10. The method of claims 8 or 9 including removing the support member having the overlay and electronic toner images thereon and fusing said toner images to said support member.

11. The method of claims 8 or 9 wherein said photoconductive member is supported on a drum and transfer is by a transfer drum of the same size as the photoconductive drum and wherein the two drums rotate at the same tangential velocity to effect the transfer of the overlay and electronic images in registration onto the support member.

12. The method of claims 8 or 9 wherein said positive overlay image is created by light reflected from an opaque positive overlay.

13. The method of claims 8 or 9 wherein said positive overlay image is created by light transmitted through a transparent positive overlay.

* * * * *